US012651156B2

(12) United States Patent
Chen et al.

(10) Patent No.: US 12,651,156 B2
(45) Date of Patent: Jun. 9, 2026

(54) METHOD AND APPARATUS FOR DETERMINING CAUSALITY, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yuguang Chen, Beijing (CN); Lu Pan, Beijing (CN); Yanhui Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1315 days.

(21) Appl. No.: 17/211,381

(22) Filed: Mar. 24, 2021

(65) Prior Publication Data

US 2021/0209472 A1 Jul. 8, 2021

(30) Foreign Application Priority Data

Mar. 27, 2020 (CN) .......................... 202010231943.0

(51) Int. Cl.
| | |
|---|---|
| *G06N 3/08* | (2023.01) |
| *G06F 9/54* | (2006.01) |
| *G06F 40/30* | (2020.01) |

(52) U.S. Cl.
CPC .............. *G06N 3/08* (2013.01); *G06F 9/542* (2013.01); *G06F 40/30* (2020.01)

(58) Field of Classification Search
CPC ......... G06F 40/30; G06F 40/284; G06N 3/02; G06N 3/082
See application file for complete search history.

(56) References Cited

U.S. PATENT DOCUMENTS

| | | | |
|---|---|---|---|
| 2010/0161612 A1 | 6/2010 | Chen et al. | |
| 2017/0250932 A1 | 8/2017 | Tee et al. | |
| 2019/0073420 A1* | 3/2019 | Agapiev | .................. G06N 3/08 |

(Continued)

FOREIGN PATENT DOCUMENTS

| | | |
|---|---|---|
| CN | 109791569 A | 5/2019 |
| CN | 110196978 A | 9/2019 |
| CN | 110704890 A | 1/2020 |

(Continued)

OTHER PUBLICATIONS

On Event Causality Detection in Tweets; Kayesh et al. (Year: 2019).*

(Continued)

*Primary Examiner* — David Yi
*Assistant Examiner* — Andrew Bracero
(74) *Attorney, Agent, or Firm* — Osha Bergman Watanabe & Burton LLP

(57) ABSTRACT

Embodiments of the present disclosure provide a method for determining causality, an apparatus for determining causality, an electronic device and a storage medium, and relates to a field of knowledge graph technologies. The method includes: obtaining event words expressing individual events and related words adjacent to the event words in a target text; inputting the event words and the related words into a graph neural network; and determining whether there is a causal relationship between any two events through the graph neural network.

9 Claims, 4 Drawing Sheets

(56) References Cited

U.S. PATENT DOCUMENTS

| 2019/0294671 A1* | 9/2019 | Chatterjee | ............. G06F 40/268 |
| 2020/0034722 A1 | 1/2020 | Oh et al. | |

FOREIGN PATENT DOCUMENTS

| CN | 110782002 A | 2/2020 |
| JP | H05120250 A | 5/1993 |
| JP | 2008203964 A | 9/2008 |
| JP | 4935405 B2 | 5/2012 |
| JP | 2013130929 A | 7/2013 |
| JP | 2018049587 A | 3/2018 |
| JP | 2018060364 A | 4/2018 |
| KR | 20190040825 A | 4/2019 |
| WO | 2018066445 A1 | 4/2018 |

OTHER PUBLICATIONS

Zhou et al., "Graph neural networks: A review of methods and applications" (Year: 2019).*
Ji et al., "Refining Event Extraction through Cross-document Inference" (Year: 2008).*
Kayesh et al., "On Event Causality Detection in Tweets", (Year: 2019).*
Liu et al., "Jointly Multiple Events Extraction via Attention-based Graph Information Aggregation", (Year: 2018).*
Li et al., "Constructing Narrative Event Evolutionary Graph for Script Event Prediction" (Year: 2018).*
Extended European Search Report issued in European Application No. 21156353.1, mailed on Jul. 8, 2021 (12 pages).
"Jointly Multiple Events Extraction via Attention-based Graph Information Aggregation;" Oct. 23, 2018; XP055818680; Retrieved from the Internet: URL:https://arxiv.org/pdf/1809.09078v2.pdf (10 pages).
"Graph Neural Networks:A Review of Methods and Applications" Jul. 10, 2019; XP055787108; Retrieved from the Internet: URL: http://web.archive.org/web/20080403235803/http://arxiv.org/pdf/1812.08434.pdf (22 pages).
"Graph Convolutional Networks with Argument-Aware Pooling for Event Detection" Feb. 2, 2018 XP055818672; Retrieved from the Internet: URL: http:///aaai.org/ocs/index.php/AAAI/AA AilS/paper/viewFile/16329/16155 (8 pages).
Office Action issued in Chinese Application No. 202010231943.0, mailed on Feb. 28, 2023 (16 pages).
Written Decision on Registration issued in Korean Application No. 210-2021-0038733, mailed on Mar. 31, 2023 (10 pages).
Shengwei et al.; "Causal Relation Extraction of Uyghur Events Based on Bidirectional Long Short-term Memory Model;" Journal of Electronics & Information Technology; vol. 40; No. 1; Jan. 2018; pp. 201-208 (9 pages).
Wenjing et al.; "Argument Causality Judgement of Journalism Field;" Harbin Institute of Technology; Jun. 2018; pp. 1-62 (68 pages).
Li et al.; "Knowledge-oriented Convolutional Neural Network for Causal Relation Extraction from Natural Language Texts;" Expert Systems with Applications; Aug. 7, 2018; pp. 1-42 (43 pages).
Mayuanyuan et al.; "Research on Technology and Application of Information Extraction" p. 1 (1 page).
Office Action issued in corresponding JP Application No. 2021-047864 with English translation dated May 31, 2022 (10 pages).

* cited by examiner

S101 obtaining event words expressing individual events and related words adjacent to the event words in a target text

S102 inputting the event words and the related words into a graph neural network

S103 determining whether there is a causal relationship between any two events through the graph neural network

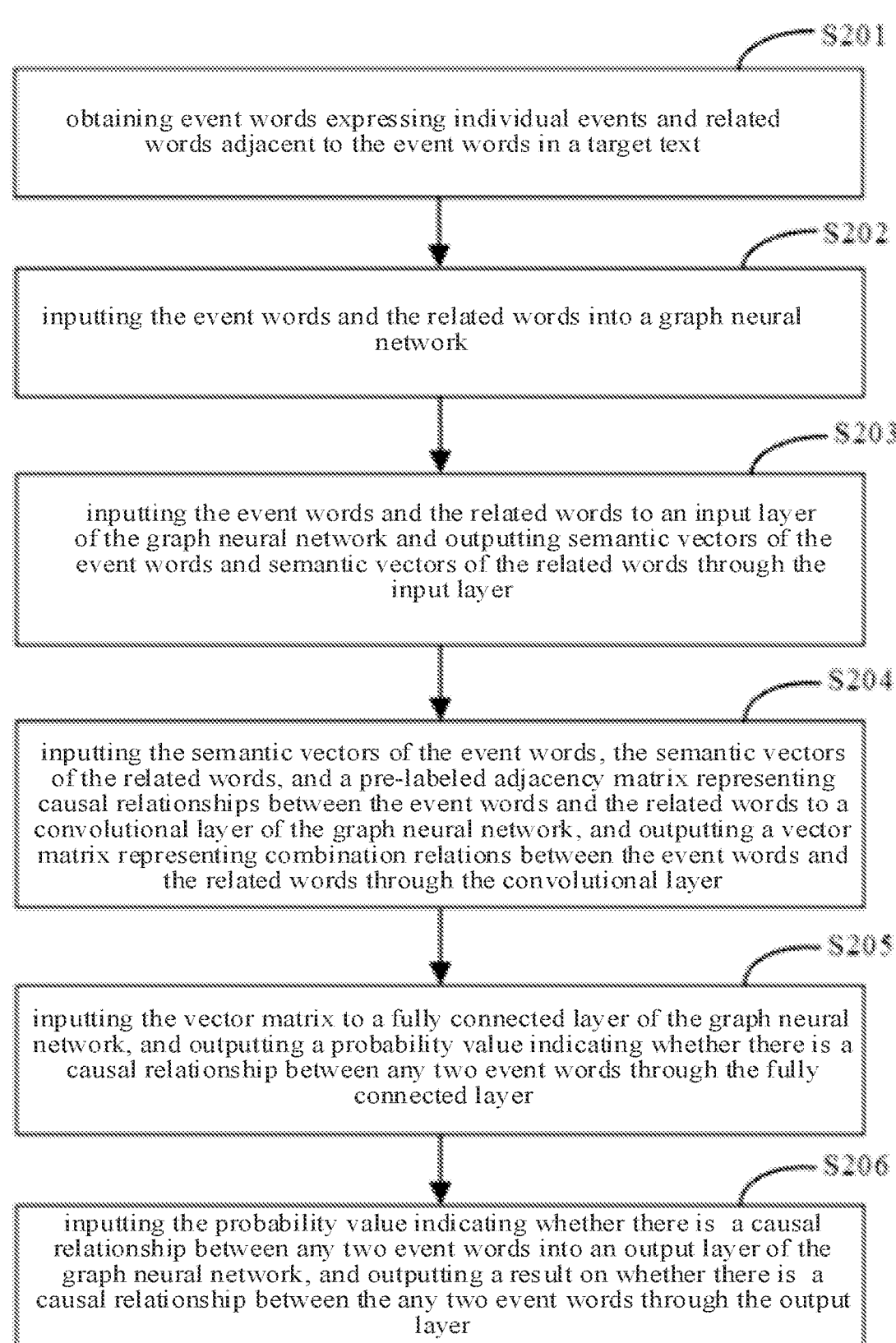

S201 obtaining event words expressing individual events and related words adjacent to the event words in a target text

S202 inputting the event words and the related words into a graph neural network

S203 inputting the event words and the related words to an input layer of the graph neural network and outputting semantic vectors of the event words and semantic vectors of the related words through the input layer

S204 inputting the semantic vectors of the event words, the semantic vectors of the related words, and a pre-labeled adjacency matrix representing causal relationships between the event words and the related words to a convolutional layer of the graph neural network, and outputting a vector matrix representing combination relations between the event words and the related words through the convolutional layer

S205 inputting the vector matrix to a fully connected layer of the graph neural network, and outputting a probability value indicating whether there is a causal relationship between any two event words through the fully connected layer

S206 inputting the probability value indicating whether there is a causal relationship between any two event words into an output layer of the graph neural network, and outputting a result on whether there is a causal relationship between the any two event words through the output layer

FIG. 2

METHOD AND APPARATUS FOR DETERMINING CAUSALITY, ELECTRONIC DEVICE AND STORAGE MEDIUM

CROSS-REFERENCE TO RELATED APPLICATIONS

This application claims priority to and benefits of Chinese Patent Application No. 202010231943.0, filed with the State Intellectual Property Office of P. R. China on Mar. 27, 2020, which is incorporated herein by reference.

TECHNICAL FIELD

The present disclosure relates to a field of computer application technologies, specifically a field of knowledge graph technologies, and more particularly, to a method for determining causality, an apparatus for determining causality, an electronic device and a storage medium.

BACKGROUND

Human society is a world created by dynamic activities of static objects. Human memory is stored in units of events. Taking events as the basic knowledge unit could better reflect knowledge of the objective world. A causal relationship between events has a lot of value for applications such as event prediction. There are a large number of causal relationships in an event graph. In an existing causality determination method, artificially constructed semantic features are usually used to determine whether there is a causal relationship between events. For example, for event A and event B, assuming an event word contained in event A and an event word contained in event B are the same or similar, in the related art, a semantic feature of the event word contained in event A may be artificially constructed, and then a semantic feature of the event word contained in event B is constructed artificially, so that only semantic information of the event words is focused on, and if the semantic information of the events is not sufficiently expressed, the determination result of the causal relationship between the events may be affected. Further, the existing causality determination method has high labor costs and low determination efficiency.

SUMMARY

The embodiments of this disclosure provide a method for determining causality, an apparatus for determining causality, an electronic device and a storage medium.

In a first aspect, embodiments of the present disclosure provide a method for determining causality. The method includes: obtaining event words expressing individual events and related words adjacent to the event words in a target text; inputting the event words and the related words into a graph neural network; and determining whether there is a causal relationship between any two events through the graph neural network.

In a second aspect, embodiments of the present disclosure provide an apparatus for determining causality. The apparatus includes an obtaining module, an inputting module and a determining module.

The obtaining module is configured to obtain event words expressing individual events and related words adjacent to the event words in a target text.

The inputting module is configured to input the event words and the related words into a graph neural network.

The determining module is configured to determine whether there is a causal relationship between any two events through the graph neural network.

In a third aspect, embodiments of the present disclosure provide an electronic device. The electronic device includes: one or more processors; and a memory for storing one or more programs, when the one or more programs are executed by the one or more processors, the one or more processors are caused to implement the method according to any embodiment of the present disclosure.

In a fourth aspect, embodiments of the present disclosure provide a non-transitory storage medium having a computer program stored thereon that, when executed by a processor, the method according to any embodiment of the present disclosure is implemented.

Additional effects of the above-mentioned alternative implementation are described below in combination with specific embodiments.

BRIEF DESCRIPTION OF THE DRAWINGS

The drawings are used to better understand the solution and do not constitute a limitation to the disclosure, in which:

FIG. 2 is a flowchart of a method for determining causality according to Embodiment 2 of the present disclosure.

DETAILED DESCRIPTION

The following describes the exemplary embodiments of the present disclosure with reference to the accompanying drawings, which includes various details of the embodiments of the present disclosure to facilitate understanding, which shall be considered merely exemplary.

Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Embodiment 1

Figure 1:
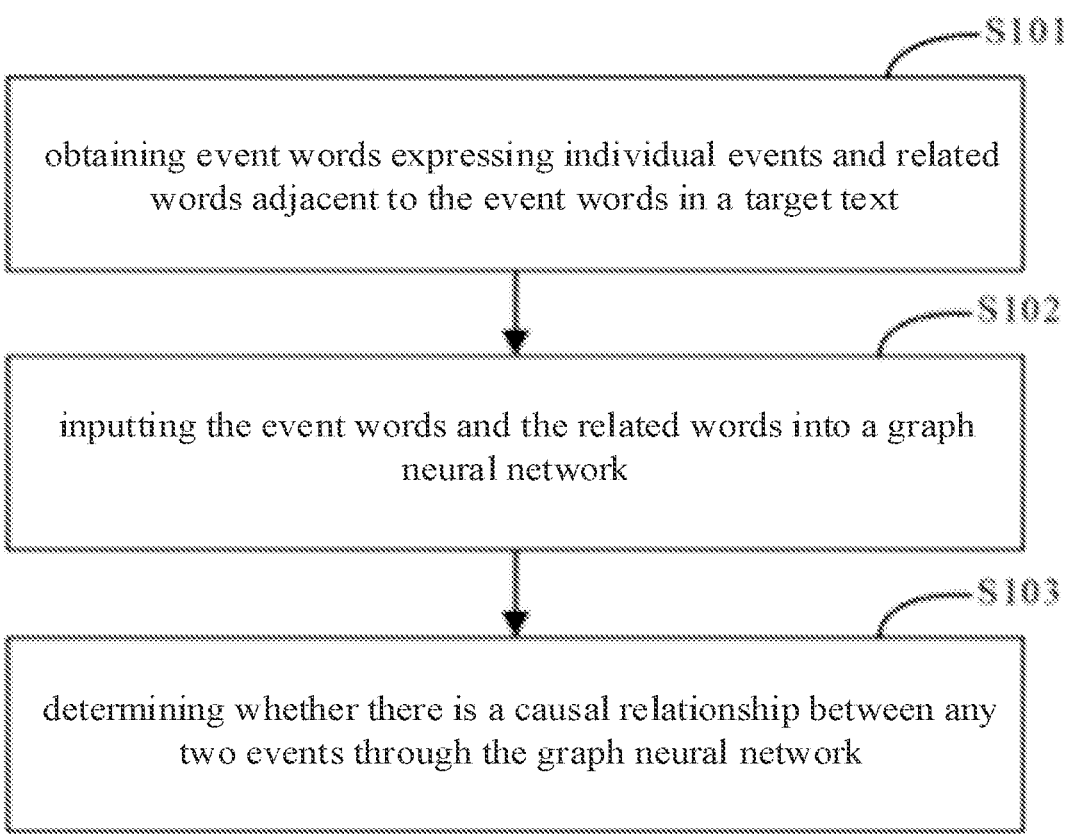
FIG. 1 is a flowchart of a method for determining causality according to Embodiment 1 of the present disclosure.

FIG. 1 is a flowchart of a method for determining causality according to Embodiment 1 of the present disclosure. The method is implemented by an apparatus for determining causality or an electronic device. The apparatus or electronic device is implemented by software and/or hardware. The apparatus or electronic device could be integrated in any smart device with network communication function. As illustrated in FIG. 1, the method for determining causality may include the following steps.

At block S101, event words expressing individual events and related words adjacent to the event words in a target text are obtained.

In the specific embodiment of the present disclosure, the electronic device may obtain event words expressing individual events and related words adjacent to the event words from the target text. In detail, the electronic device may divide the target text into a plurality of sentences, extract a sentence from the plurality of sentences as a current sentence, and extract an event word from the current sentence when the current sentence meets an event word extraction condition, and extract a related word adjacent to the event word from the current sentence when the current sentence meets a related word extraction condition. The operation of extracting the event word and the related word is repeated for each of the plurality of sentences until the event word and related word adjacent to the event word are extracted from each of the plurality of sentences. In detail, the event word extraction condition may be that there is at least one noun in the sentence. If there is at least one noun in a sentence, it is determined that the sentence meets the event word extraction condition. If there is no noun in the sentence, it is determined that the sentence does not meet the event word extraction condition. Further, the related word extraction condition may be that there is at least one noun on the left side of the event word in the sentence, or there is at least one noun on the right side of the event word. If there is at least one noun on the left side of the event word, or there is at least one noun on the right side of the event word, it is determined that the sentence meets the related word extraction condition. If there is no noun existing on the left side of the event word and there is no noun existing on the right side of the event word, it is determined that the sentence does not meet the related word extraction condition. For example, for the sentence "the top ten economical stars in the entertainment industry", since there are two nouns "entertainment industry" and "stars" in this sentence, it is determined that this sentence meets the event word extraction condition. Then, grammatical analysis and part-of-speech tagging are performed on the sentence, and the event word of this sentence is determined as "stars". Since there is a noun "entertainment industry" on the right of the event word "stars", it is determined that this sentence meets the related word extraction condition, and then the related word "entertainment industry" is extracted from this sentence.

In the embodiment, an event word and a related word adjacent to the event word are extracted from each sentence. Since the event word and the related word have similar meanings, and the event word and of the related word are relatively close in terms of a semantic vector, it may be accurately determined whether there is a causal relationship between any two events by considering both the event word and the related word adjacent to the event word.

At block S102, the event words and the related words are input into a graph neural network.

In a specific embodiment of the present disclosure, the electronic device may input the event words and the related words into the graph neural network. According to computer science, a graph is a data structure composed of two components: vertices and edges. For example, graph G is described based on a set of vertices and edges. The edges herein could be directed or undirected, which depends on whether there is a direction dependency between the vertices. The graph neural network is a neural network directly running on a graph structure.

At block S103, whether there is a causal relationship between any two events is determined through the graph neural network.

In a specific embodiment of the present disclosure, the electronic device may determine whether there is a causal relationship between any two events through the graph neural network. In detail, the electronic device may input the event words and the related words to an input layer of the graph neural network and output semantic vectors of the event words and semantic vectors of the related words through the input layer. Then, the electronic device may input the semantic vectors of the event words, the semantic vectors of the related words, and a pre-labeled adjacency matrix representing causal relationships between the event words and the related words to a convolutional layer of the graph neural network and output a vector matrix representing combination relations between the event words and the related words through the convolutional layer. Then, the electronic device may input the vector matrix to a fully connected layer of the graph neural network, output a probability value indicating whether there is a causal relationship between any two event words through the fully connected layer, input the probability value indicating whether there is a causal relationship between any two event words into an output layer of the graph neural network, and output a result on whether there is a causal relationship between the any two event words through the output layer. Preferably, it is assumed that the electronic device extracts event word A and related words A1 and A2 adjacent to the event word A from the first sentence of the target text, and extracts event word B and related words B1 and B2 adjacent to the event word B from the second sentence of the target text. In the specific embodiment of the present disclosure, the electronic device may predetermine a three-dimensional adjacency matrix representing causal relationships between event word A and related words A1 and A2, and a three-dimensional adjacency matrix representing causal relationships between event word B and related words B1 and B2. In each adjacency matrix, if there is a causal relationship between the event word and the related word, a corresponding value of the event word and the related word is set as 1. If there is no causal relationship between the event word and the related word, the corresponding value of the event word and the related word is set as 0, thus the three-dimensional adjacency matrix representing causal relationships between event word A and related words A1 and A2, and the three-dimensional adjacency matrix representing causal relationships between event word B and related words B1 and B2 can be determined.

In the embodiment, the event words expressing individual events and the related words adjacent to the event words are sequentially inputted to the input layer, the convolutional layer, a fully connected layer and the output layer of the graph neural network, and the result on whether there is a causal relationship between any two events is output through the output layer. Since the semantic vectors of the event words and the semantic vectors of the related words can be output through the input layer, the vector matrix representing the combination relations between the event words and the related words can be output through the convolutional layer, and the probability value indicating whether there is a causal relationship between any two event words can be output through the fully connected layer, through calculation processes of the graph neural network, an electronic device may accurately determine whether there is a causal relationship between any two event words.

In the specific embodiment of the present disclosure, the methods for the electronic device to convert the event word and the related word into the semantic vectors may include: bag-of-words model. Latent Semantic Analysis (LSA), Probabilistic Latent Semantic Analysis (PLSA), Latent Semantic Indexing (LSI), Probabilistic Latent Semantic Indexing (PLSI). In practice, tools such as Word2Vec/

Doc2Vec can be used to convert the event word and the related word in each sentence into corresponding semantic vectors.

In the specific embodiment of the present disclosure, the dimension of the adjacency matrix can be determined by a sum of the number of the event words and the number of the related words. Assuming that for a certain sentence, the sum of the number of the event words and the number of the related words is 3, the adjacency matrix representing causal relationships between the event words and the related words is set as a three-dimensional adjacency matrix.

In the method for determining causality of the present disclosure, the event words expressing individual events and the related words adjacent to the event words in the target text are obtained. The event words and the related words are input into the graph neural network. It is determined whether there is a causal relationship between any two events through the graph neural network. In other words, this disclosure determines whether there is a causal relationship between any two events through the graph neural network, so as to accurately determine whether there is a causal relationship between the events while saving labor costs and improving determination efficiency. In the existing causality determination method, artificially constructed semantic features are usually adopted to determine whether there is a causal relationship between events, thus not only whether there is a causal relationship between events could not be determined accurately, but also labor cost is high and the determination efficiency is low. Since this disclosure adopts technical means of obtaining the event words and the related words and judging the causality through the graph neural network, the technical problems of inaccurate determination, high labor cost and low determination efficiency in the related art could be overcome. Furthermore, the technical effects of accurately determining whether there is a causal relationship between events, saving labor costs and improving the determination efficiency are achieved. Moreover, the technical solutions of the embodiments of the present disclosure are simple, convenient, easy to popularize, and have a wider application range.

Embodiment 2

FIG. 2 is a flowchart of a method for determining causality according to Embodiment 2 of the present disclosure. As illustrated in FIG. 2, the method for determining causality includes the following steps.

At block S201, event words expressing individual events and related words adjacent to the event words in a target text are obtained.

In the specific embodiment of the present disclosure, the electronic device may obtain the event words expressing individual events and the related words adjacent to the event words from the target text. In detail, the electronic device may divide the target text into a plurality of sentences, extract a sentence from the plurality of sentences as a current sentence, extract an event word from the current sentence when the current sentence meets an event word extraction condition, and extract a related word adjacent to the event word from the current sentence when the current sentence meets a related word extraction condition. The operation of extracting the event word and the related word is repeated for each of the plurality of sentences until the event word and related word adjacent to the event word are extracted from each of the plurality of sentences.

At block S202, the event words and the related words are input into a graph neural network.

In a specific embodiment of the present disclosure, the electronic device may input the event words and the related words into the graph neural network. For example, the electronic device extracts the event word A and the related words A1 and A2 adjacent to the event word A from the first sentence of the target text, and extracts the event word B and the related words B1 and B2 adjacent to the event word B from the second sentence of the target text. In this step, the electronic device inputs the event word A and the related words A1 and A2 adjacent to the event word A extracted from the first sentence, and the event word B and the related words B1 and B2 adjacent to the event word B extracted from the second sentence into the graph neural network.

At block S203, the event words and the related words are input to an input layer of the graph neural network and semantic vectors of the event words and semantic vectors of the related words are output through the input layer.

In the specific embodiment of the present disclosure, the electronic device may input the event words and the related words adjacent to the event words to the input layer of the graph neural network, and output the semantic vectors of the event words and semantic vectors of the related words through the input layer. In detail, the method by which the electronic device converts the event words and the related words into the semantic vectors may include: bag-of-words model, LSA, PLSA, LSI, PLSI methods. In practice, the electronic device may use tools such as Word2Vec/Doc2Vec to convert the event word and the related word in each sentence into the corresponding semantic vectors.

At block S204, the semantic vectors of the event words, the semantic vectors of the related words, and a pre-labeled adjacency matrix representing causal relationships between the event words and the related words are input to a convolutional layer of the graph neural network, and a vector matrix representing combination relations between the event words and the related words is output through the convolutional layer.

In a specific embodiment of the present disclosure, the electronic device may input the semantic vectors of the event words, the semantic vectors of the related words, and the pre-labeled adjacency matrix representing causal relationships between the event words and the related words to the convolutional layer of the graph neural network, and output the vector matrix representing the combination relations between the event words and the related words through the convolutional layer. In detail, the electronic device may determine feature information of each event word and feature information of the related word adjacent to the event word as content of an event node to obtain at least two event nodes, generate one or more edges between the at least two event nodes through the convolutional layer based on relevancy information between the at least two event nodes to obtain an event graph, and output the vector matrix based on the event graph. Preferably, the electronic device may predetermine a three-dimensional adjacency matrix representing causal relationships between the event word A and the related words A1 and A2, and a three-dimensional adjacency matrix representing causal relationships between the event word B and the related words B1 and B2. In each adjacency matrix, if there is a causal relationship between the event word and the related word, the corresponding value of the event word and the related word is set as 1. If there is no causal relationship between the event word and the related word, the corresponding value of the event word and the related word is set as 0, thus the three-dimensional adjacency matrix representing causal relationships between the event word A and the related words A1 and A2, and the three-dimensional adjacency matrix representing causal relationship between the event word B and the related words B1 and B2 can be determined.

In this embodiment, one or more edges between the at least two event nodes may be generated through the convolutional layer based on the relevancy information between the at least two event nodes to obtain the event graph. Then the vector matrix is output based on the event graph. In this way, whether there is a causal relationship between events is accurately determined, labor costs are saved, and the determination efficiency is improved.

At block S205, the vector matrix is input to a fully connected layer of the graph neural network, and a probability value indicating whether there is a causal relationship between any two event words is output through the fully connected layer.

In the specific embodiment of the present disclosure, the electronic device may input the vector matrix to the fully connected layer of the graph neural network and output the probability value indicating whether there is a causal relationship between any two event words through the fully connected layer. In detail, the electronic device may extract any two row vectors from the vector matrix, and then input the two extracted row vectors to the fully connected layer until every combination of any two row vectors in the vector matrix is input to the fully connected layer. The electronic device may also input the entire vector matrix to the fully connected layer.

The probability value indicating whether there is a causal relationship between any two event words is output through the fully connected layer. For example, assuming that the output result corresponding to the first row vector is 0.8, the output result corresponding to the second row vector is 0.2, then the probability value indicating whether there is a causal relationship between the first event word and the second event word is output, which is 0.8.

At block S206, the probability value indicating whether there is a causal relationship between any two event words is input into an output layer of the graph neural network, and a result on whether there is a causal relationship between the any two event words is output through the output layer.

In the specific embodiment of the present disclosure, the electronic device may input the probability value indicating whether there is a causal relationship between any two event words into the output layer of the graph neural network and output the result on whether there is a causal relationship between the any two event words through the output layer. In detail, if the probability value indicating whether there is a causal relationship between any two event words is greater than or equal to a preset threshold, it is determined that there is a causal relationship between the two event words. If the probability value indicating whether there is a causal relationship between any two event words is less than the preset threshold, it is determined that there is no causal relationship between the two event words.

Preferably, in the specific embodiment of the present disclosure, the electronic device may obtain the training data of the graph neural network before inputting the event words and the related words into the graph neural network. The processing parameters of the graph neural network are trained according to the training data to generate the graph neural network.

In this embodiment, the training data of the graph neural network is obtained in advance. The processing parameters of the graph neural network are trained based on the training data to generate the graph neural network. "The trained graph neural network may accurately determine whether there is a causal relationship between events, further, the labor costs are saved and the determination efficiency is improved."

With the method for determining causality according to the present disclosure, the event words expressing individual events and the related words adjacent to the event words in the target text are obtained. The event words and the related words are input into the graph neural network. It is determined whether there is a causal relationship between any two events through the graph neural network. In other words, this disclosure determines whether there is a causal relationship between any two events through the graph neural network, so as to accurately determine whether there is a causal relationship between the events, while saving labor costs and improving determination efficiency. In the existing casually determination method, artificially constructed semantic features are usually adopted to determine whether there is a causal relationship between events. Thus, whether there is a causal relationship between events could not be determined accurately, but also labor cost is high and the determination efficiency is low. Since this disclosure adopts technical means of obtaining the event words and the related words and judging the causality through the graph neural network, the technical problems of inaccurate determination, high labor cost and low determination efficiency in the related art could be overcome. Furthermore, the technical effects of accurately determining whether there is a causal relationship between events, saving labor costs and improving the determination efficiency are achieved. Moreover, the technical solutions of the embodiments of the present disclosure are simple, convenient, easy to popularize, and have a wider application range.

Embodiment 3

Figure 3:
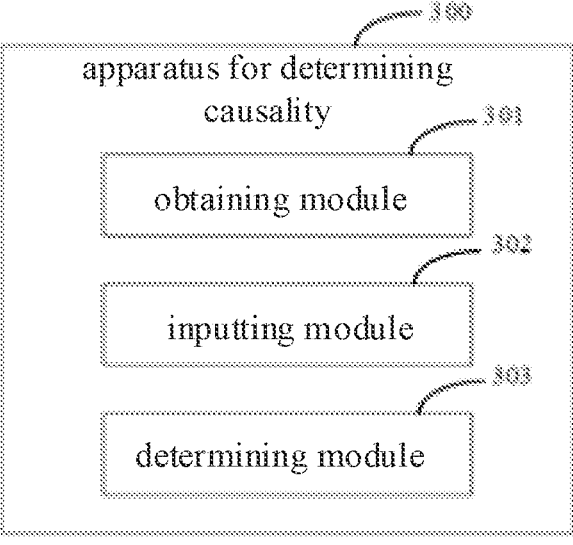
FIG. 3 is a schematic diagram of an apparatus for determining causality according to Embodiment 3 of the present disclosure.

FIG. 3 is a schematic diagram of an apparatus 300 for determining causality according to Embodiment 3 of the present disclosure. As illustrated in FIG. 3, the apparatus 300 includes an obtaining module 301, an inputting module 302, and a determining module 303.

The obtaining module 301 is configured to obtain event words expressing individual events and related words adjacent to the event words in a target text.

The inputting module 302 is configured to input the event words and the related words into a graph neural network.

The determining module 303 is configured to determine whether there is a causal relationship between any two events through the graph neural network.

Figure 4:
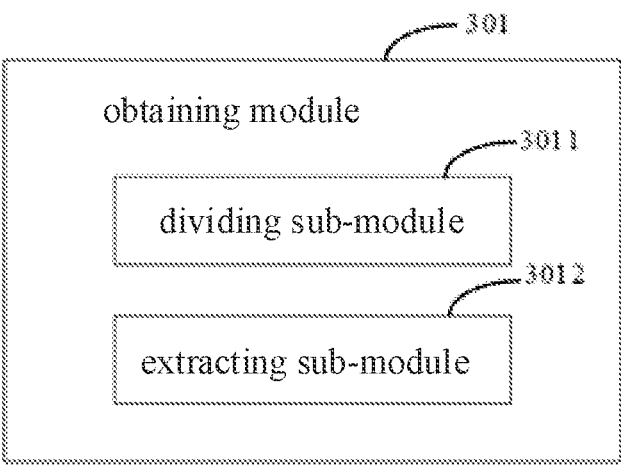
FIG. 4 is a schematic diagram of an obtaining module according to Embodiment 3 of the present disclosure.

FIG. 4 is a schematic diagram of an obtaining module according to Embodiment 3 of the present disclosure. As illustrated in FIG. 4, the obtaining module 301 includes a dividing sub-module 3011 and an extracting sub-module 3012.

The dividing sub-module 3011 is configured to divide the target text into a plurality of sentences.

The extracting sub-module 3012 is configured to extract a sentence from the plurality of sentences as a current sentence, extract an event word from the current sentence when the current sentence meets an event word extraction condition extract a related word adjacent to the event word from the current sentence when the current sentence meets a related word extraction condition, and repeat the operation of extracting the event word and the related word for each of the plurality of sentences until the event word and related word adjacent to the event word are extracted from each of the plurality of sentences.

Moreover, the determining module 303 is further configured to: input the event words and the related words to an input layer of the graph neural network, output semantic vectors of the event words and semantic vectors of the related words through the input layer, input the semantic vectors of the event words, the semantic vectors of the related words and a pre-labeled adjacency matrix representing causal relationships between the event words and the related words to a convolutional layer of the graph neural network, output a vector matrix representing combination relations between the event words and the related words through the convolutional layer, input the vector matrix to a fully connected layer of the graph neural network, output a probability value indicating whether there is a causal relationship between any two event words through the fully connected layer, input the probability value indicating whether there is a causal relationship between any two event words into an output layer of the graph neural network, and output a result on whether there is a causal relationship between the any two event words through the output layer.

Furthermore, the determining module 303 is configured to determine feature information of each event word and feature information of the related word adjacent to the event word as content of an event node to obtain at least two event nodes, generate one or more edges between the at least two event nodes through the convolutional layer based on relevancy information between the at least two event nodes to obtain an event graph, and output the vector matrix based on the event graph.

The apparatus further includes: a training module 304 (not shown) configured to obtain training data of the graph neural network, and train processing parameters of the graph neural network based on the training data to generate the graph neural network.

The above-mentioned apparatus for determining causality could implement the method provided in any embodiment of the present disclosure, and has corresponding functional modules and beneficial effects for the execution method. Technical details not described in detail in this embodiment could refer to the method for determining causality according to any embodiment of this disclosure.

Embodiment 4

According to the embodiments of the present disclosure, the disclosure also provides an electronic device and a readable storage medium.

Figure 5:
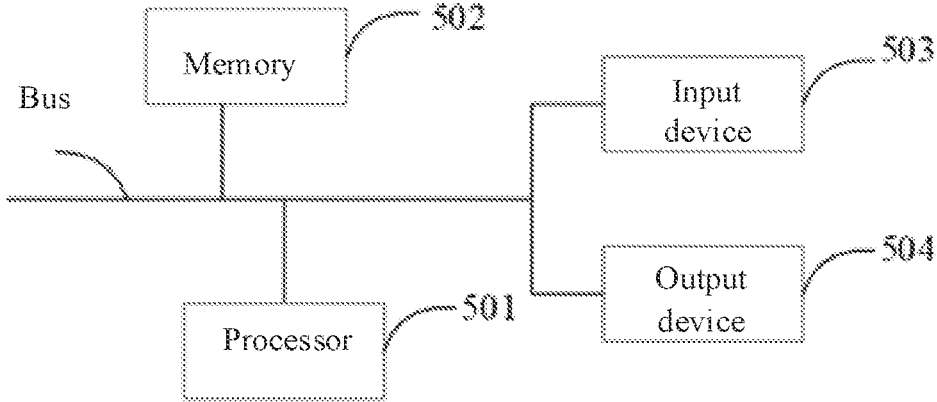
FIG. 5 is a block diagram of an electronic device used to implement the method for determining causality according to an embodiment of the present disclosure.

FIG. 5 is a block diagram of an electronic device used to implement the method for determining causality according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes, one or more processors 501, a memory 502, and interfaces for connecting various components, including a high-speed interface and a low-speed interface. The various components are interconnected using different buses and can be mounted on a common mainboard or otherwise installed as required.

The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 502 is configured to store non-transitory software programs, non-transitory computer executable programs and modules, such as program instructions/modules (for example, the obtaining module 310, the inputting module 320, and the determining module 330 shown in FIG. 3) corresponding to the method in the embodiment of the present disclosure. The processor 501 executes various functional applications and data processing of the server by running non-transitory software programs, instructions, and modules stored in the memory 502, that is, implementing the method in the foregoing method embodiments.

The memory 502 may include a storage program area and a storage data area, where the storage program area may store an operating system and application programs required for at least one function. The storage data area may store data created according to the use of the electronic device for implementing the method. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the present disclosure, the event words expressing individual events and the related words adjacent to the event words in the target text are obtained. The event words and the related words are input into the graph neural network. It is determined whether there is a causal relationship between any two events through the graph neural network. In other words, this disclosure determines whether there is a causal relationship between any two events through the graph neural network, so as to accurately determine whether there is a causal relationship between the events, while saving labor costs and improving determination efficiency. In the existing causality determination method, artificially constructed semantic features are usually adopted to determine whether there is a causal relationship between events, thus not only whether there is a causal relationship between events could not be determined accurately, but also labor cost is high and the determination efficiency is low. Since this disclosure adopts technical means of obtaining the event words and the related words and judging the causality through the graph neural network, the technical problems of inaccurate determination, high labor cost and low determination efficiency in the related art could be overcome. Furthermore, the technical effects of accurately determining whether there is a causal relationship between events, saving labor costs and improving the determination efficiency are achieved. Moreover, the technical solutions of the embodiments of the present disclosure are simple, convenient, easy to popularize, and have a wider application range.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for determining causality, comprising:

obtaining event words expressing individual events and related words adjacent to the event words in a target text;

inputting the event words and the related words into a graph neural network, wherein a graph is a data structure composed of two components: a vertex and an edge, the graph is described based on a set of vertices and edges, the edges are directed or undirected, which depends on whether there is a direction dependency between the vertices, and the graph neural network is a neural network directly running on a graph structure; and determining whether there is a causal relationship between any two events through the graph neural network;

wherein the determining whether there is a causal relationship between any two events through the graph neural network comprises:

inputting the event words and the related words to an input layer of the graph neural network and outputting semantic vectors of the event words and semantic vectors of the related words through the input layer;

inputting the semantic vectors of the event words, the semantic vectors of the related words, and a pre-labeled adjacency matrix representing causal relationships between the event words and the related words to a convolutional layer of the graph neural network, and outputting a vector matrix representing combination relations between the event words and the related words through the convolutional layer, wherein in the pre-labeled adjacency matrix, a value of 1 indicates that there is a causal relationship between an event word and a related word corresponding to the value, and a value of 0 indicates that there is no causal relationship between an event word and a related word corresponding to the value;

inputting the vector matrix to a fully connected layer of the graph neural network, and outputting a probability value indicating whether there is a causal relationship between any two event words through the fully connected layer; and inputting the probability value indicating whether there is a causal relationship between any two event words into an output layer of the graph neural network, and outputting a result on whether there is a causal relationship between the any two event words through the output layer;

wherein the outputting the vector matrix representing the combination relations between the event words and the related words through the convolutional layer comprises:

determining feature information of each event word and feature information of the related word adjacent to the event word as content of an event node to obtain at least two event nodes;

generating one or more edges between the at least two event nodes through the convolutional layer based on relevancy information between the at least two event nodes to obtain an event graph; and outputting the vector matrix based on the event graph;

wherein the method further comprises:

identifying, from the event graph stored in memory, one or more nodes connected by a causal edge to a current event node; selecting a subsequent event node having a probability value of causality exceeding a threshold; and outputting the subsequent event as a predicted event.

2. The method according to claim 1, wherein the obtaining the event words expressing individual events and the related words adjacent to the event words in the target text comprises:

dividing the target text into a plurality of sentences;

extracting a sentence from the plurality of sentences as a current sentence, and extracting an event word from the current sentence when the current sentence meets an event word extraction condition;

extracting a related word adjacent to the event word from the current sentence when the current sentence meets a related word extraction condition; and repeating the operation of extracting the event word and the related word for each of the plurality of sentences until the event word and related word adjacent to the event word are extracted from each of the plurality of sentences.

3. The method according to claim 1, further comprising:

obtaining training data of the graph neural network; and training processing parameters of the graph neural network based on the training data to generate the graph neural network.

4. An electronic device, comprising:

at least one processor; and a memory communicatively connected to the at least one processor; wherein, the memory stores instructions executable by the at least one processor, and when the instructions are executed by the at least one processor, the at least one processor is caused to:

obtain event words expressing individual events and related words adjacent to the event words in a target text;

input the event words and the related words into a graph neural network, wherein a graph is a data structure composed of two components: a vertex and an edge, the graph is described based on a set of vertices and edges, the edges are directed or undirected, which depends on whether there is a direction dependency between the vertices, and the graph neural network is a neural network directly running on a graph structure; and determine whether there is a causal relationship between any two events through the graph neural network;

wherein the processor is configured to determine whether there is a causal relationship between any two events through the graph neural network by:

inputting the event words and the related words to an input layer of the graph neural network and outputting semantic vectors of the event words and semantic vectors of the related words through the input layer;

inputting the semantic vectors of the event words, the semantic vectors of the related words, and a pre-labeled adjacency matrix representing causal relationships between the event words and the related words to a convolutional layer of the graph neural network, and outputting a vector matrix representing combination relations between the event words and the related words through the convolutional layer, wherein in the pre-labeled adjacency matrix, a value of 1 indicates that there is a causal relationship between an event word and a related word corresponding to the value, and a value of 0 indicates that there is no causal relationship between an event word and a related word corresponding to the value;

inputting the vector matrix to a fully connected layer of the graph neural network, and outputting a probability value indicating whether there is a causal relationship between any two event words through the fully connected layer; and inputting the probability value indicating whether there is a causal relationship between any two event words into an output layer of the graph neural network, and outputting a result on whether there is a causal relationship between the any two event words through the output layer;

wherein the outputting the vector matrix representing the combination relations between the event words and the related words through the convolutional layer comprises:

determining feature information of each event word and feature information of the related word adjacent to the event word as content of an event node to obtain at least two event nodes;

generating one or more edges between the at least two event nodes through the convolutional layer based on relevancy information between the at least two event nodes to obtain an event graph; and outputting the vector matrix based on the event graph;

wherein the processor is configured to identify, from the event graph stored in memory, one or more nodes connected by a causal edge to a current event node;

select a subsequent event node having a probability value of causality exceeding a threshold; and output the subsequent event as a predicted event.

5. The electronic device according to claim 4, wherein the processor is configured to obtain the event words expressing individual events and the related words adjacent to the event words in the target text by:

dividing the target text into a plurality of sentences;

extracting a sentence from the plurality of sentences as a current sentence, and extracting an event word from the current sentence when the current sentence meets an event word extraction condition;

extracting a related word adjacent to the event word from the current sentence when the current sentence meets a related word extraction condition; and repeating the operation of extracting the event word and the related word for each of the plurality of sentences until the event word and related word adjacent to the event word are extracted from each of the plurality of sentences.

6. The electronic device according to claim 4, wherein the processor is further configured to:

obtain training data of the graph neural network; and train processing parameters of the graph neural network based on the training data to generate the graph neural network.

7. A non-transitory computer-readable storage medium storing computer instructions, wherein the computer instructions are used to make the computer implement a method for determining causality, comprising:

obtaining event words expressing individual events and related words adjacent to the event words in a target text;

inputting the event words and the related words into a graph neural network, wherein a graph is a data structure composed of two components: a vertex and an edge, the graph is described based on a set of vertices and edges, the edges are directed or undirected, which depends on whether there is a direction dependency between the vertices, and the graph neural network is a neural network directly running on a graph structure; and determining whether there is a causal relationship between any two events through the graph neural network;

wherein the determining whether there is a causal relationship between any two events through the graph neural network comprises:

inputting the event words and the related words to an input layer of the graph neural network and outputting semantic vectors of the event words and semantic vectors of the related words through the input layer;

inputting the semantic vectors of the event words, the semantic vectors of the related words, and a pre-labeled adjacency matrix representing causal relationships between the event words and the related words to a convolutional layer of the graph neural network, and outputting a vector matrix representing combination relations between the event words and the related words through the convolutional layer, wherein in the pre-labeled adjacency matrix, a value of 1 indicates that there is a causal relationship between an event word and a related word corresponding to the value, and a value of 0 indicates that there is no causal relationship between an event word and a related word corresponding to the value;

inputting the vector matrix to a fully connected layer of the graph neural network, and outputting a probability value indicating whether there is a causal relationship between any two event words through the fully connected layer; and inputting the probability value indicating whether there is a causal relationship between any two event words into an output layer of the graph neural network, and outputting a result on whether there is a causal relationship between the any two event words through the output layer;

wherein the outputting the vector matrix representing the combination relations between the event words and the related words through the convolutional layer comprises:

determining feature information of each event word and feature information of the related word adjacent to the event word as content of an event node to obtain at least two event nodes;

generating one or more edges between the at least two event nodes through the convolutional layer based on relevancy information between the at least two event nodes to obtain an event graph; and outputting the vector matrix based on the event graph;

wherein the method further comprises:

identifying, from the event graph stored in memory, one or more nodes connected by a causal edge to a current event node; selecting a subsequent event node having a probability value of causality exceeding a threshold; and outputting the subsequent event as a predicted event.

8. The non-transitory computer-readable storage medium according to claim 7, wherein the obtaining the event words expressing individual events and the related words adjacent to the event words in the target text comprises:

dividing the target text into a plurality of sentences;

extracting a sentence from the plurality of sentences as a current sentence, and extracting an event word from the current sentence when the current sentence meets an event word extraction condition;

extracting a related word adjacent to the event word from the current sentence when the current sentence meets a related word extraction condition; and repeating the operation of extracting the event word and the related word for each of the plurality of sentences until the event word and related word adjacent to the event word are extracted from each of the plurality of sentences.

9. The non-transitory computer-readable storage medium according to claim 8, wherein the method further comprises:

obtaining training data of the graph neural network; and training processing parameters of the graph neural network based on the training data to generate the graph neural network.

\* \* \* \* \*